(12) United States Patent
Masami et al.

(10) Patent No.: US 8,097,991 B2
(45) Date of Patent: Jan. 17, 2012

(54) RECIPROCATING VIBRATION GENERATOR

(75) Inventors: Yamazaki Masami, Ueda (JP); Furuichi Keisuke, Ueda (JP); Katou Hiroki, Ueda (JP)

(73) Assignee: Sanyo Seimitsu Co., Ltd., Nagano-ken (JP)

( * ) Notice: Subject to any disclaimer, the term of this patent is extended or adjusted under 35 U.S.C. 154(b) by 266 days.

(21) Appl. No.: 12/606,550

(22) Filed: Oct. 27, 2009

(65) Prior Publication Data
US 2010/0102646 A1   Apr. 29, 2010

(30) Foreign Application Priority Data
Oct. 28, 2008   (JP) .................................. 2008-276547

(51) Int. Cl.
*H02K 33/00* (2006.01)
(52) U.S. Cl. ................. 310/29; 310/51; 310/15
(58) Field of Classification Search ............ 310/15, 310/17, 12.04, 25, 29, 30, 51
See application file for complete search history.

(56) References Cited

U.S. PATENT DOCUMENTS

| | | | | |
|---|---|---|---|---|
| 3,558,939 | A * | 1/1971 | Olson ........................ | 310/15 |
| 7,619,498 | B2 * | 11/2009 | Miura ......................... | 335/222 |
| 7,696,655 | B2 * | 4/2010 | Shishido et al. ............ | 310/51 |
| 2003/0227225 | A1 * | 12/2003 | Kaneda et al. ............. | 310/81 |
| 2005/0285454 | A1 * | 12/2005 | Choi et al. .................. | 310/14 |
| 2006/0002577 | A1 * | 1/2006 | Won et al. .................. | 381/396 |
| 2006/0077867 | A1 * | 4/2006 | Suprun ....................... | 369/125 |
| 2007/0100255 | A1 * | 5/2007 | Boecker et al. ............ | 600/583 |
| 2007/0207672 | A1 * | 9/2007 | Takagi et al. ............... | 439/607 |

FOREIGN PATENT DOCUMENTS

JP   2002-263578 A1   9/2002

* cited by examiner

*Primary Examiner* — Quyen Leung
*Assistant Examiner* — Naishadh Desai
(74) *Attorney, Agent, or Firm* — Kratz, Quintos & Hanson, LLP

(57) ABSTRACT

A reciprocating vibration generator of a structure enabling force of a reciprocating vibrating body striking a coil to be absorbed by magnetic fluid even if an external impact force is applied, that is, a reciprocating vibration generator provided in a case body 100 with an upper plate spring 40 and a lower plate spring 50 for supporting a ring-shaped weight 20 having a ring-shaped permanent magnet 30 comprised of a combination of semi-ring-shaped permanent magnets 30R, 30L at its inner circumference side so as to be able to reciprocally vibrate in a vertical direction and a cylindrical excitation coil 60 passing through the inside of the ring-shaped permanent magnet 30 in the vertical direction and generating a reciprocating vibrating magnetic field, wherein the semi-ring-shaped permanent magnets 30R, 30L are magnetized in a direction spanning the inner circumferential surface and outer circumferential surface, the inner circumferential surface and top and bottom end faces of the semi-ring-shaped permanent magnet 30R, 30L are covered by magnetic fluid F, and a gap between the inner circumferential surface and the outer circumferential surface of the excitation coil 60 is filled with magnetic fluid F.

5 Claims, 8 Drawing Sheets

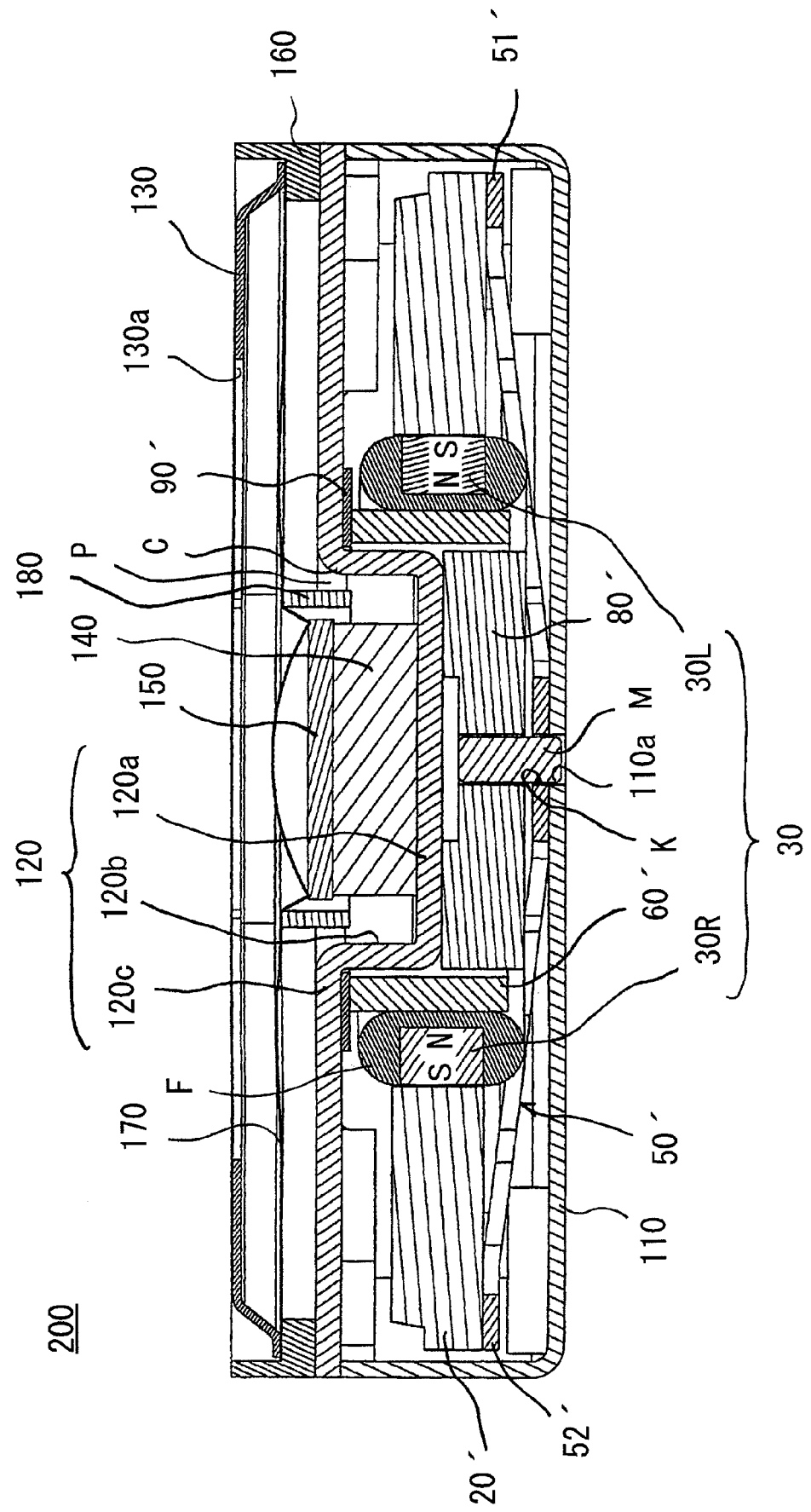

RECIPROCATING VIBRATION GENERATOR

CROSS-REFERENCE TO RELATED APPLICATIONS

This application is based upon and claims the benefit of priority of the prior Japanese Patent Application No. 2008-276547, filed on Oct. 28, 2008, the entire contents of which are incorporated herein by reference.

BACKGROUND OF THE INVENTION

1. Field of the Invention

The present invention relates to a reciprocating vibration generator used for a mobile phone etc., more particularly relates to a reciprocating vibration generator having a reciprocating vibrating body.

2. Description of the Related Art

For example, a vibroacoustic converter disclosed in Japanese Patent Publication (A) No. 2002-263578 is provided with a sound generating vibration plate with an outside end fastened to a top end of a cylindrical case, a plate fastening the outside end to the bottom end of the case, two plate springs supporting a ring-shaped weight to be able to reciprocate up and down, a bottom yoke plate fastened to an inner circumferential surface of the ring-shaped weight, a disk-shaped permanent magnet fastened on this bottom yoke plate and magnetized in the vertical direction, an upper yoke plate fastened to a top surface of this disk-shaped permanent magnet, a cylindrical voice coil fastened to a bottom surface of a sound generating vibration plate and with a front end side fit into a gap between an outer circumferential surface of the disk-shaped permanent magnet and an inner circumferential surface of the ring-shaped weight, and a magnetic fluid adhering to a bottom surface of the bottom yoke plate and functioning as a shock absorber for the plate.

The magnetic flux emitted from a disk-shaped permanent magnet magnetized in the vertical direction becomes leakage magnetic flux oriented from the bottom yoke plate toward the plate, so the closer the bottom yoke plate to the plate facing it, the more the magnetic flux of the bottom yoke plate bridges to the plate and acts as a shock absorber so can prevent abnormal noise at the time of collision.

In the above vibroacoustic converter, collision of the bottom yoke plate forming the reciprocating vibrating body and the plate facing this can be absorbed by the magnetic fluid, but when mounting a vibroacoustic converter in a mobile phone, the reciprocating vibrating body shakes in a direction off from the vertical direction in the face of external impact force given from various directions to the vibroacoustic converter, so the pole pieces of the reciprocating vibrating body collide with the voice coil in the gap and invite damage to the windings of the voice coil etc.

SUMMARY OF THE INVENTION

Therefore, in consideration of the above problem, an object of the present invention is to provide a reciprocating vibration generator of a structure enabling the force of the reciprocating vibrating body striking the coil to be absorbed by magnetic fluid even if an external impact force is applied.

The present invention provides a reciprocating vibration generator provided in a case with an elastic member for supporting a ring-shaped weight having a ring-shaped permanent magnet at its inner circumference side to be able to reciprocate in the vertical direction and a cylindrical excitation coil passing through the inside of the ring-shaped permanent magnet in the vertical direction and generating a reciprocating vibrating magnetic field, wherein the ring-shaped permanent magnet is magnetized in a direction spanning that inner circumferential surface and outer circumferential surface, the inner circumferential surface and top and bottom end faces of the ring-shaped permanent magnet are magnetically covered by magnetic fluid, and a gap between the inner circumferential surface and the outer circumferential surface of the excitation coil is filled with magnetic fluid.

The ring-shaped permanent magnet fit at the inner circumference side of the ring-shaped weight is not magnetized in the vertical direction, but is magnetized in a direction spanning the inner circumferential surface and outer circumferential surface, so the magnetic flux emitted from the inner circumferential surface of the ring-shaped permanent magnet passes near the top and bottom end faces and reaches the boundary between the inner circumferential surface of the ring-shaped weight and the outer circumferential surface of the ring-shaped permanent magnet. The magnetic fluid coated on this ring-shaped permanent magnet surrounds the inner circumferential surface and top and bottom end faces of the ring-shaped permanent magnet. The gap between the inner circumferential surface of the ring-shaped permanent magnet and the outer circumferential surface of the excitation coil is filled with magnetic fluid. Due to the magnetic fluid serving as this shock absorbing layer, even if external impact force is given, collision of the ring-shaped permanent magnet against the excitation coil can be effectively suppressed and damage to the excitation coil can be prevented in advance.

Further, the top and bottom end faces of the ring-shaped magnet are also covered by magnetic fluid, so collision of the ring-shaped permanent magnet against fastening parts in the case in the vertical direction can also be absorbed.

The ring-shaped permanent magnet may also be a single ring-shaped permanent magnet magnetized in a radial direction from the ring-shaped center, but to facilitate magnetization, it may also be comprised of a pair of semi-ring-shaped permanent magnets fit at the inner circumference side of the ring-shaped weight with magnetic poles facing each other. When the semi-ring-shaped permanent magnets are magnetized in parallel, the abutting faces of the ring-shaped walls are the same polarity and repel each other and can strengthen the action of continuing to press the outer circumferential surfaces of the two semi-ring-shaped permanent magnet against the inner circumferential surface of the ring-shaped weight, so the ring-shaped weight and ring-shaped permanent magnet are strongly joined together.

Here, specifically, the elastic member has an upper plate spring connecting an end of an outer circumference side elastic piece to a top end face of the ring-shaped weight and a lower plate spring connecting an end of an outer circumference side elastic piece to a bottom end face of the ring-shaped weight, the case has an end plate fastening an inner circumference side of the lower plate spring, and the excitation coil is carried on the end plate and has a striking member made of a magnetic material passing through the inside of the excitation coil, having one end passing through a center part of the upper plate spring, having the other end passing through a hole of the lower plate spring, and striking against the end plate.

Further, the elastic member has a lower plate spring connecting an end of an outer circumference side elastic piece to a bottom end face of the ring-shaped weight, the case has a bottom plate part to which an inner circumference side of the lower plate spring is fastened, and the excitation coil stands up from an end plate made of a magnetic material closing the case and has a striking member made of a magnetic material fit inside the excitation coil, having one end striking against a center part of the end plate, and having the other end striking against the lower plate spring.

BRIEF DESCRIPTION OF THE DRAWINGS

These and other objects and features of the present invention will become clearer from the following description of the preferred embodiments given with reference to the attached drawings, wherein:

FIG. 1A is a perspective view showing a vibration linear actuator according a first embodiment of the present invention, while

FIG. 2A is a side view showing the state with a case body of the same vibration linear actuator detached, while

FIG. 3A is a plan view showing the state with a case of the same vibration linear actuator detached, while

FIG. 6A is a perspective view showing the reciprocating vibrating body and lower plate spring of the same vibration linear actuator seen from the back, while FIG. 7A is a plan view of the same reciprocating vibrating body, while FIG. 8 is a showing a longitudinal cross-sectional side view of a vibration linear actuator according to a second embodiment of the present invention 2.

DESCRIPTION OF THE PREFERRED EMBODIMENTS

Next, embodiments of the present invention will be explained with reference to the attached drawings.

First Embodiment

Figure 1A:
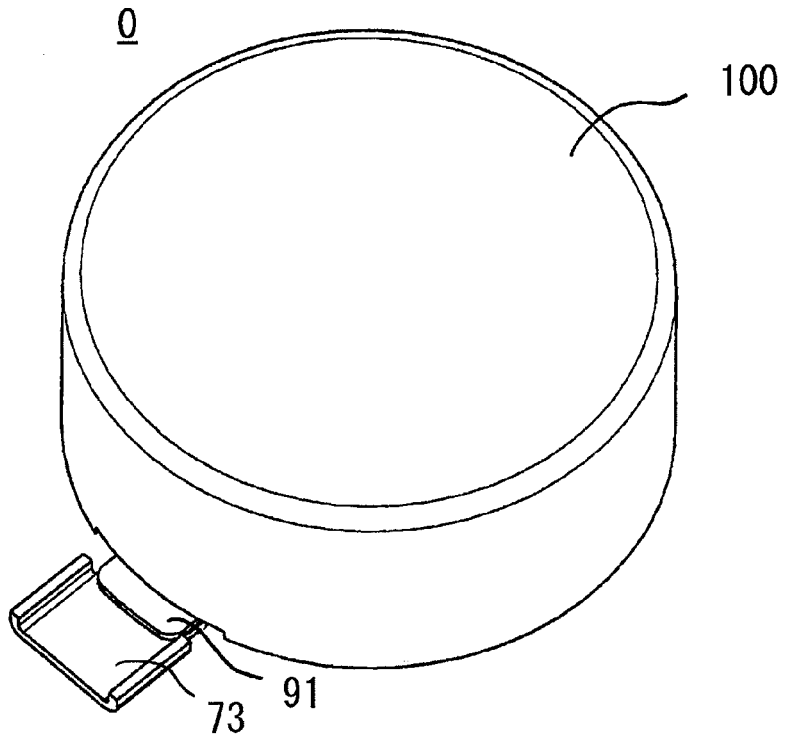
Figure 1B:
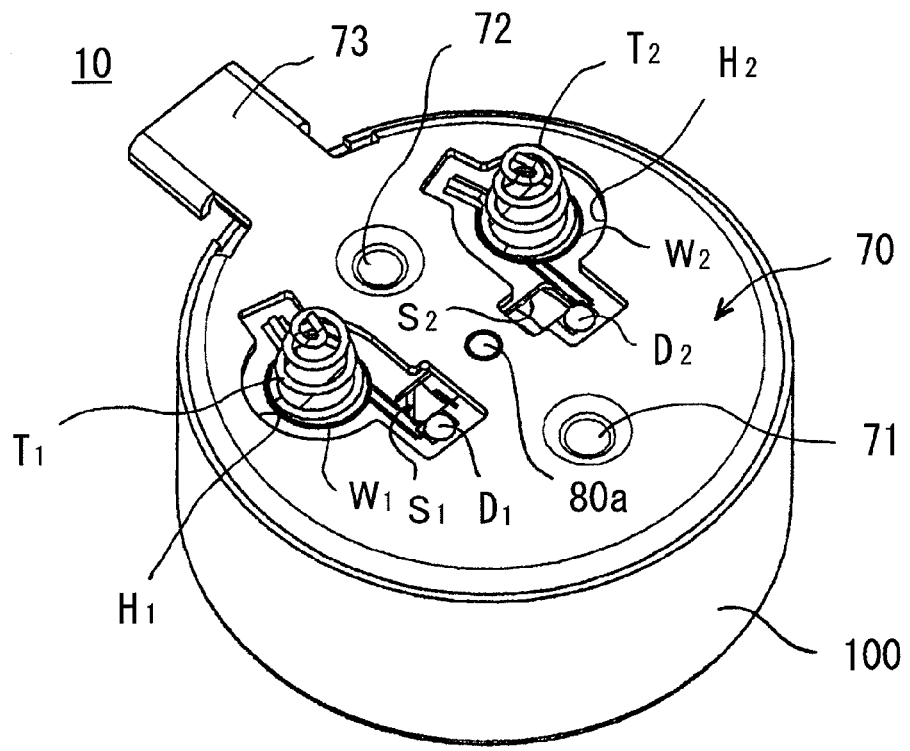
FIG. 1B is a perspective viewing showing an upside down state of the same vibration linear actuator.
Figure 2A:
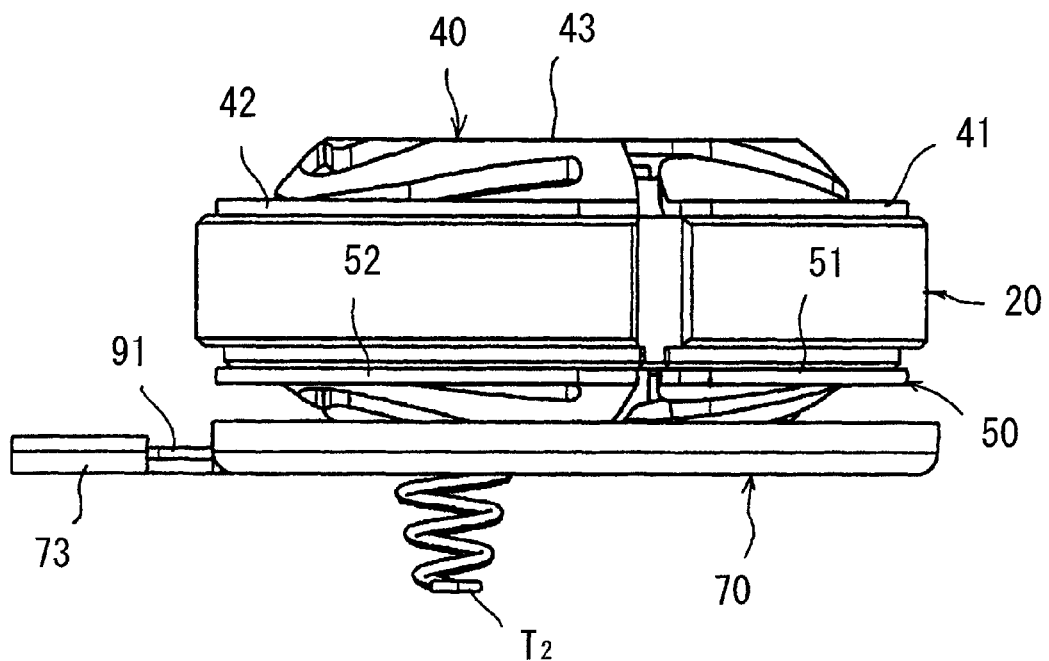
Figure 2B:
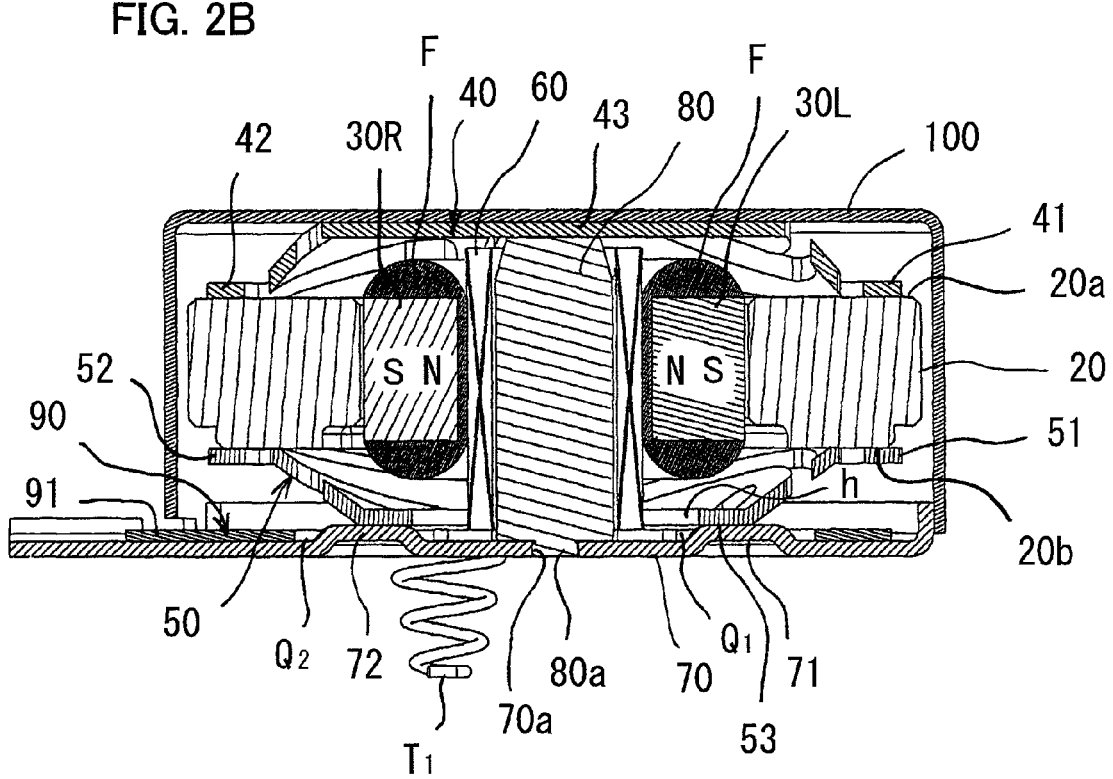
FIG. 2B is a longitudinal cross-sectional side view of the same vibration linear actuator.
Figure 3A:
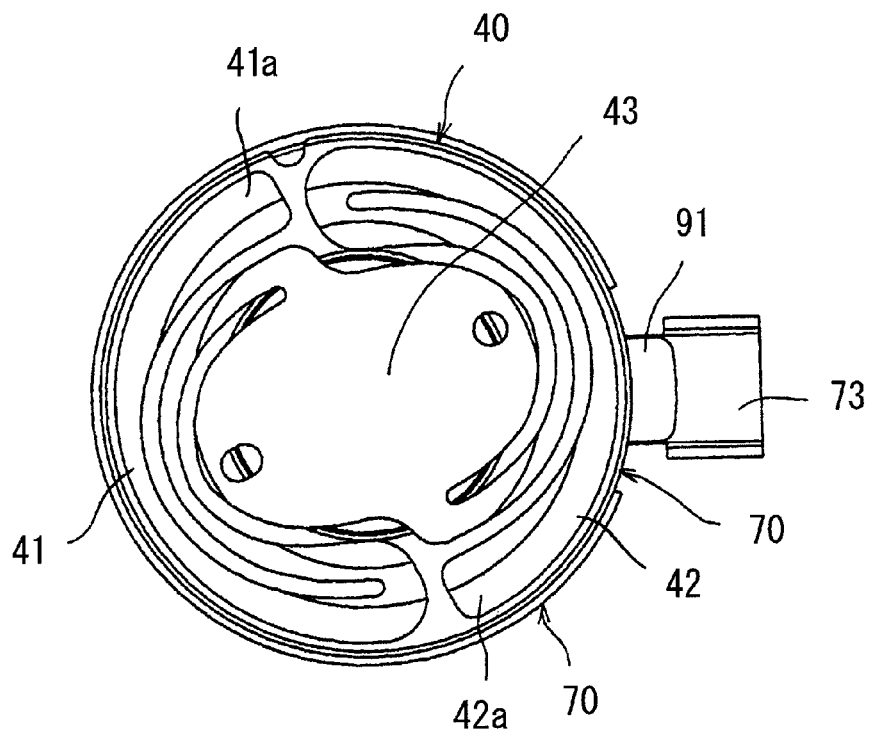
Figure 3B:
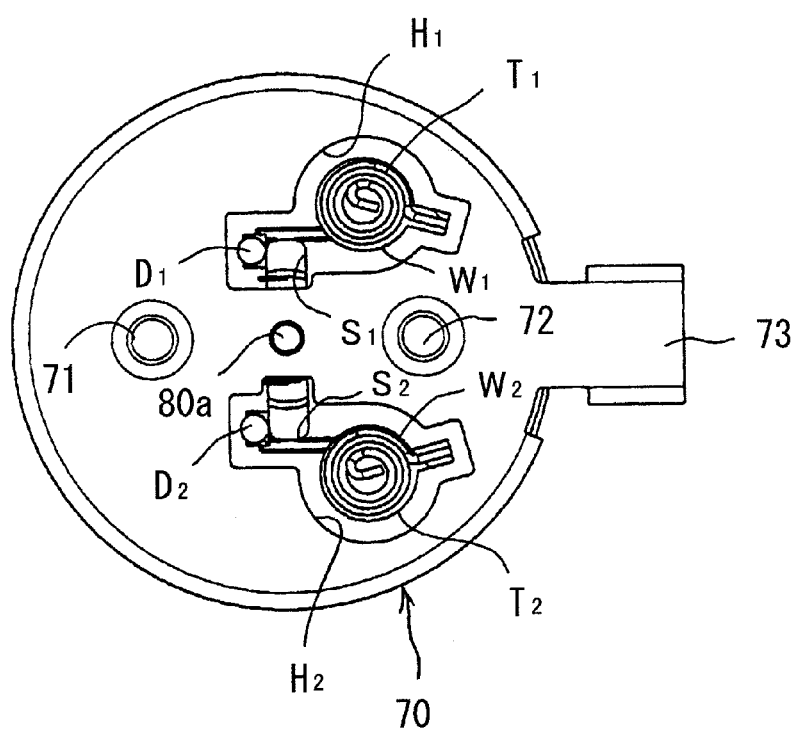
FIG. 3B is a bottom view of the same vibration linear actuator.
Figure 4:
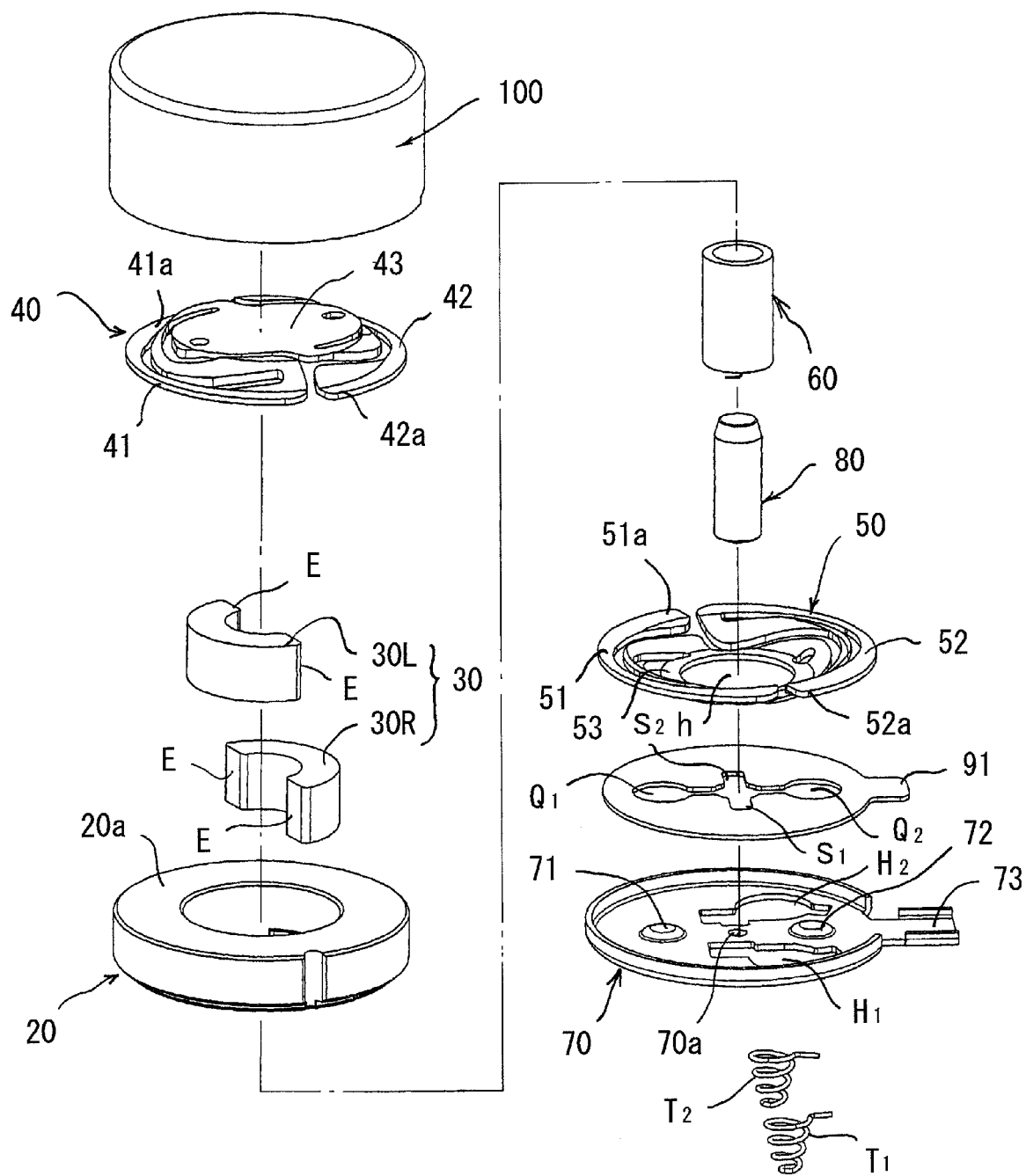
FIG. 4 is a perspective view of the assembly of the same vibration linear actuator seen from above.
Figure 5:
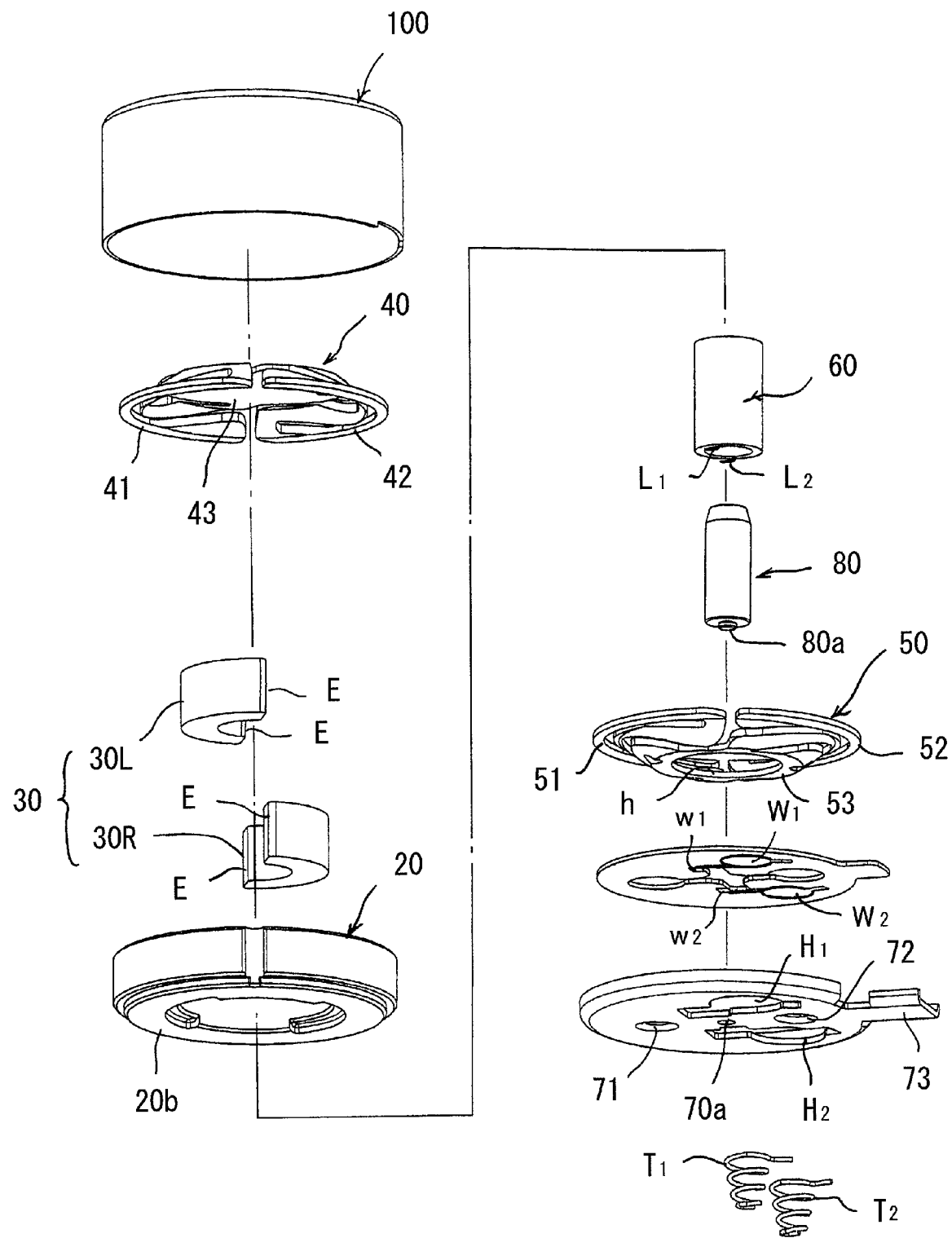
FIG. 5 is a perspective view of the assembly of the same vibration linear actuator seen from below.
Figure 6A:
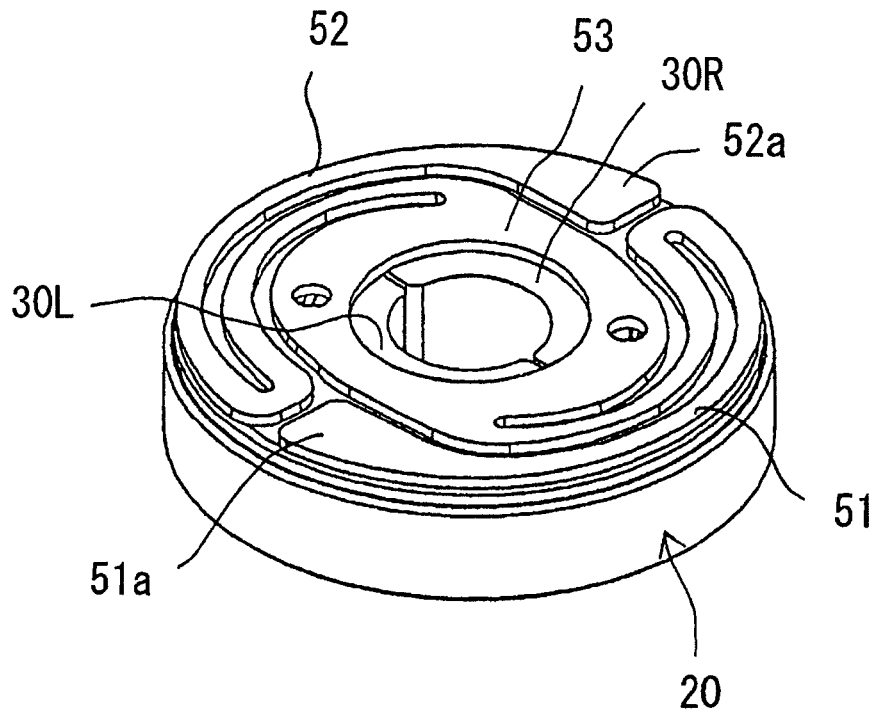
Figure 6B:
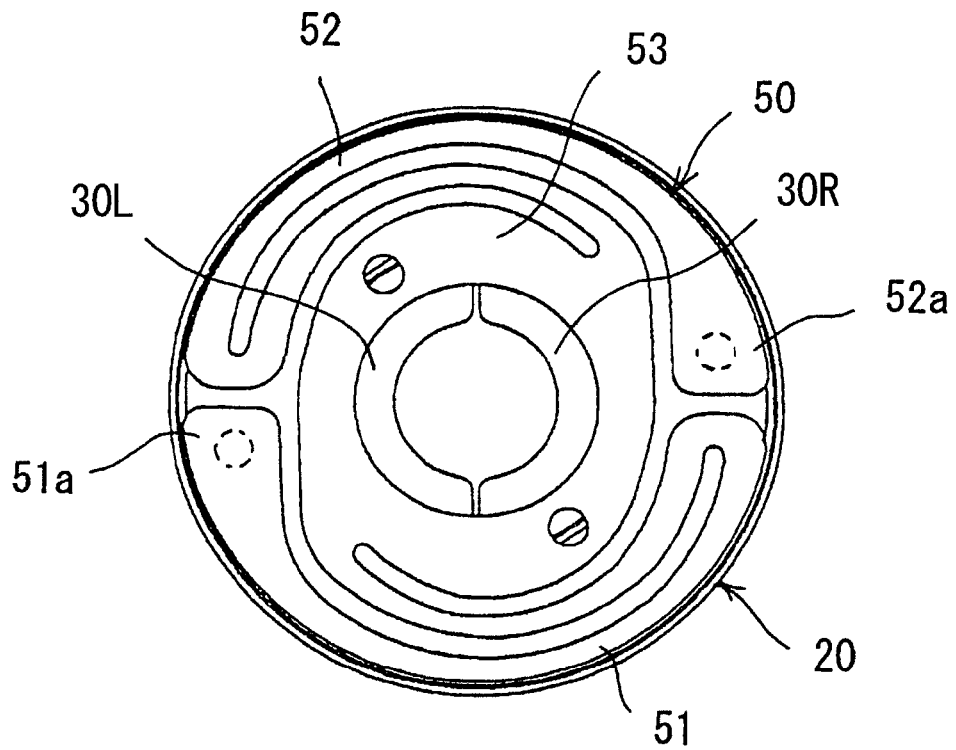
FIG. 6B is a bottom view showing the same reciprocating vibrating body and lower plate spring as seen from the back.

FIG. 1A is a perspective view showing a vibration linear actuator according a first embodiment of the present invention; FIG. 1B is a perspective viewing showing an upside down state of the same vibration linear actuator; FIG. 2A is a side view showing the state with a case body of the same vibration linear actuator detached; FIG. 2B is a longitudinal cross-sectional side view of the same vibration linear actuator; FIG. 3A is a plan view showing the state with a case of the same vibration linear actuator detached; FIG. 3B is a bottom view of the same vibration linear actuator; FIG. 4 is a perspective view of the assembly of the same vibration linear actuator seen from above; FIG. 5 is a perspective view of the assembly of the same vibration linear actuator seen from below; FIG. 6A is a perspective view showing the reciprocating vibrating body and lower plate spring of the same vibration linear actuator seen from the back; and FIG. 6B is a bottom view showing the same reciprocating vibrating body and lower plate spring as seen from the back.

The vibration linear actuator 10 of this embodiment uses as the reciprocating vibrating body a ring-shaped weight 20 and a ring-shaped permanent magnet 30 comprised of a pair of parallel magnetized semi-ring-shaped permanent magnets 30R, 30L fit at its inner circumference side with the same magnetic poles facing each other and is provided with an upper plate spring 40 connected to a top end face 20a of the ring-shaped weight 30 by spot welding outer circumference side hanging parts 41a, 42a, a lower plate spring 50 connected to a bottom end face 20b of the ring-shaped weight 20 by spot welding outer circumference side hanging parts 51a, 52a, a metal end plate 70 supporting the upper plate spring 40 and the lower plate spring 50 and mounting a cylindrical excitation coil (hollow center toroidal coil) 60 passing through the ring-shaped permanent magnet 30 and generating a reciprocating vibrating magnetic field with respect to the ring-shaped weight 20, and a cup-shaped case body 100 closed using this metal end plate 70 as a lid plate and housing the reciprocating vibrating body.

As shown in FIG. 4, the upper plate spring 40 has folded back elastic pieces 41, 42 extending from 180° rotationally symmetrical positions of an outer circumference side of a center plate part 43. The lower plate spring 50 has folded back elastic pieces 51, 52 extending from 180° rotationally symmetrical positions of an outer circumference side of a ring-shaped plate part 53 having a center hole h. The stator has, other than the excitation coil 60, the metal end plate 70 having a dish shape and fastened by the ring-shaped plate part 53 of the lower plate spring 50, a spindle (core) 80 made of a magnetic material passing through the inside of the excitation coil 60, having two ends passing through the center plate part 43 of the upper plate spring 40 and a center hole h of the lower plate spring 50, and striking against a center part of the metal end plate 70, and a printed circuit board 90 supported on the metal end plate 70 and carrying the excitation coil 60.

Figure 7A:
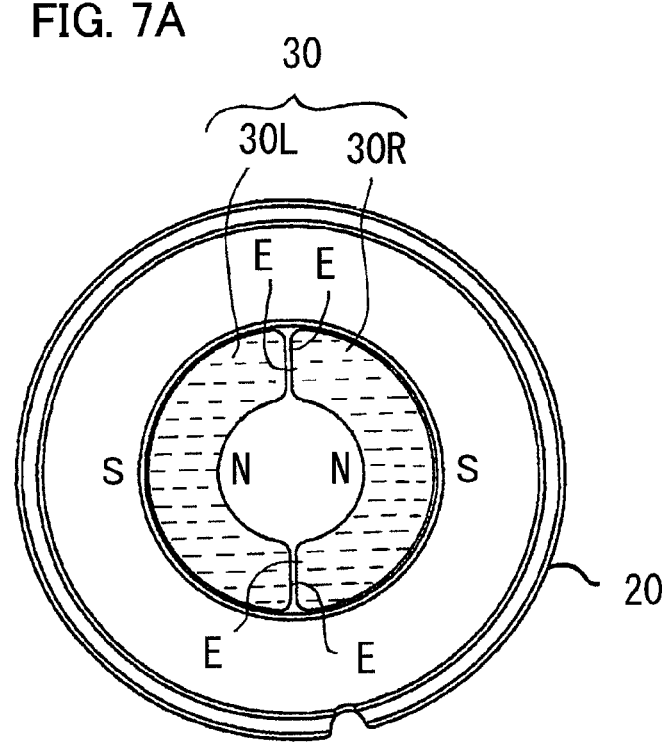
Figure 7B:
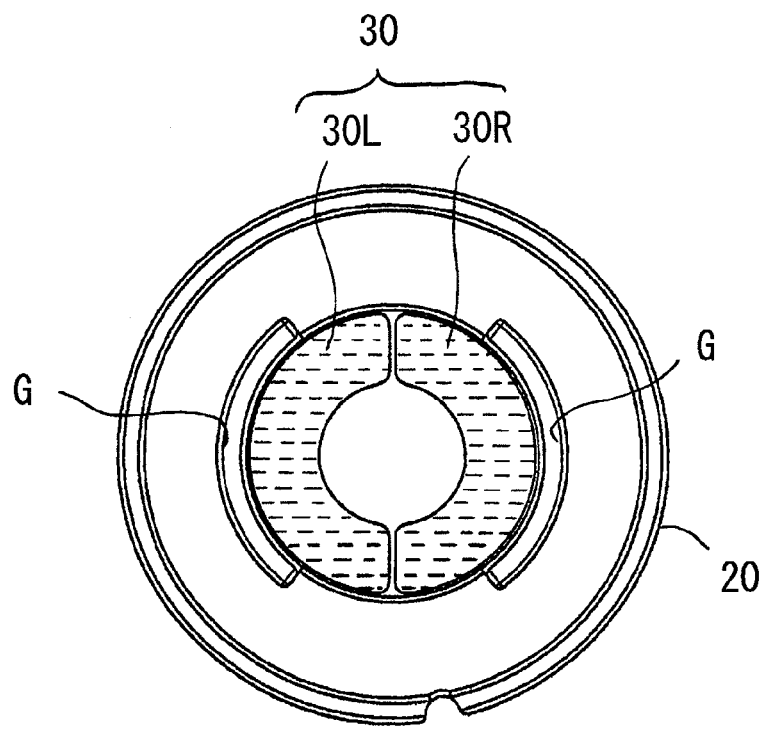
FIG. 7B is a plan view of another reciprocating vibrating body.

The semi-ring-shaped permanent magnets 30R, 30L, as shown in FIG. 7A, are magnetized in parallel in a direction spanning the inner circumferential surface and outer circumferential surface and are fit inside the ring-shaped weight 20 with the same magnetic poles facing each other. The circumferential direction end face E of either of the semi-ring-shaped permanent magnets 30R, 30L is also the same magnetic pole as the inner circumferential surface (for example, N pole), so the left and right semi-ring-shaped permanent magnets 30R, 30L magnetically repel each other, and that outer circumferential surface presses against the inner circumferential surface of the ring-shaped weight 20. Note that the outer circumferential surfaces of the semi-ring-shaped permanent magnets 30R, 30L and the inner circumferential surface of the ring-shaped weight 20 are fastened by bonding by a binder, but, as shown in FIG. 7B, the inner circumferential surface of the ring-shaped weight 20 may also be provided with binder reservoirs G.

As shown in FIG. 2B, the inner circumferential surface and top and bottom end faces of such semi-ring-shaped permanent magnets 30R, 30L (ring-shaped permanent magnet 30) are covered by a magnetic fluid F having a predetermined viscosity. The magnetic fluxes emitted from the inner circumferential surfaces of the N-poles of the semi-ring-shaped permanent magnets 30R, 30L pass near the top and bottom end faces and head out toward the outer circumferential surface, so the gap between the inner circumferential surface and excitation coil 60 is filled with the magnetic fluid F as a shock absorbing layer and the top and bottom end faces are surrounded with magnetic fluid F.

The metal end plate 70 has projecting parts 71, 72 for spot welding from the back side near 180° symmetrical positions of the ring-shaped plate part 53 of the lower plate spring 50, a projecting piece 73 receiving a protruding piece 91 of the printed circuit board 90, terminal through holes $H_1$, $H_2$ for soldering spiral shaped coil spring terminals $T_1$, $T_2$ to power feed patterns $W_1$, $W_2$ formed on the back surface of the printed circuit board 90, and a positioning hole 70a in which a projection 80a projecting out from a bottom end of the spindle 80 fits. The printed circuit board 90 has two round holes $Q_1$, $Q_2$ into which the projecting parts 71, 72 fit and coil terminal end through holes $S_1$, $S_2$ perpendicularly intersecting a straight slot connecting these round holes $Q_1$, $Q_2$ for soldering coil terminal ends $L_1$, $L_2$ of the excitation coil 60 to parts $w_1$, $w_2$ of the back surface power feed patterns $W_1$, $W_2$ by solder bumps $D_1$, $D_2$.

The excitation coil 60 is mounted on the printed circuit board 90. The coil terminal ends $L_1$, $L_2$ are hooked at the rims of the coil terminal end through holes $S_1$, $S_2$ and soldered to parts of $w_1$, $w_2$ of the power feed patterns $W_1$, $W_2$. The spindle 80 of the magnetic material is mounted on the metal end plate 70 through the center of the coil terminal end through holes $S_1$, $S_2$ of the printed circuit board 90. The projection 80a is fit into the positioning hole 70a.

Note that in the present embodiment, the vibration linear actuator 10 is mounted on a printed circuit board in a mobile phone where the excitation coil 60 can be fed power through the coil spring terminals $T_1$, $T_2$ and the power feed patterns $W_1$, $W_2$, but by changing the power feed patterns $W_1$, $W_2$ of the printed circuit board 90, it is possible to feed power to the excitation coil 60 without using the coil spring terminals $T_1$, $T_2$.

In the state where no power is being fed to the excitation coil 60, the ring-shaped weight 20 stops at the axial direction neutral position shown in FIG. 2B where the elastic springback force acting outward of the top end face 20a due to the elastic deformation of the upper plate spring 40 and the elastic springback force acting outward of the bottom end face 20b due to the elastic deformation of the lower plate spring 50 balance, but when the excitation coil 60 is supplied with alternating current and a reciprocating vibrating magnetic field is formed, the upper plate spring 40 and lower plate spring 50 alternately repeat an operation of springing back to a free state of the planar shape, so the ring-shaped weight 20 reciprocally moves in the thrust direction and generates reciprocal vibration.

Here, the ring-shaped permanent magnet 30 fit at the inner circumference side of the ring-shaped weight 20 is not magnetized in the vertical direction, but is magnetized in a direction spanning the inner circumferential surface and the outer circumferential surface, so the magnetic flux emitted from the inner circumferential surface of the ring-shaped permanent magnet 30 passes near the top and bottom end faces and reaches the boundary of the inner circumferential surface of the ring-shaped weight 20 and the outer circumferential surface of the ring-shaped permanent magnet 30. The magnetic fluid F coated on this ring-shaped permanent magnet 30 surrounds the inner circumferential surface and top and bottom end faces of the ring-shaped permanent magnet 30, and the gap between the inner circumferential surface of the ring-shaped permanent magnet 30 and the outer circumferential surface of the excitation coil 60 is filled with magnetic fluid F. Due to the magnetic fluid F used as the shock absorber layer, even if external impact force is applied, collision with the excitation coil 60 of the ring-shaped permanent magnet 30 can be effectively suppressed and damage of the excitation coil 60 can be prevented in advance. Further, the top and bottom end faces of the ring-shaped magnet 30 are also coated with the magnetic fluid F, so collision of the ring-shaped permanent magnet 30 with the upper plate spring 40 and the case body 100 and with the lower plate spring 50 and the metal end plate 70 etc. in the vertical direction can also be absorbed.

Further, the excitation coil 60 is a toroidal coil which is cylindrical and long, so it is possible to reduce the outside diameter dimension and secure the ampere turns. Further, it does not have any coil bobbin, so the coil terminal ends $L_1$, $L_2$ of the bottom end can be connected as they are to the power feed patterns $W_1$, $W_2$ of the printed circuit board 90.

Note that in the present embodiment, only the bottom end of the spindle 80 is provided with a projection 80a, but the top end may also be provided with a projection for fitting into a positioning hole formed in the center plate part 43 of the upper plate spring 40.

Second Embodiment

FIG. 8 is a longitudinal cross-sectional side view showing a vibration linear actuator according to an embodiment of the present invention 2. The vibration linear actuator 200 of this embodiment is a vibroacoustic converter equipped with a speaker function. It has a flat cup-shaped lower case body 110 for holding the reciprocating vibrating body and has a shared yoke 120. The part from this shared yoke 120 to the cover 130 of the sound hole 130a forms a speaker part.

The reciprocating vibrating body has a ring-shaped weight 20' and a ring-shaped permanent magnet 30 comprised of a parallel magnetized pair of semi-ring-shaped permanent magnets 30R, 30L fit at the inner circumference side with the same magnetic poles facing each other. The plate spring of this embodiment is only the lower plate spring 50'. This is attached by inserting the center shaft M into the center hole K and positioning hole 110a and has elastic pieces 51', 52' supporting the ring-shaped weight 20'. The cylindrical excitation coil (hollow center toroidal coil) 60' fit inside the ring-shaped permanent magnet 30 and generating a reciprocating vibrating magnetic field with respect to the ring-shaped weight 20' hangs down from a ring-shaped printed circuit board 90' fastened to the shared yoke 120. At the inside of this excitation coil 60', a lower core 80' made of a magnetic material attached to the center shaft M is inserted. The shared yoke 120 has a center tube part 120b and flange plate part 120c of the bottom plate part 120a. At the inside of the excitation coil 60', the center tube part 120b is fit from above. The bottom plate part 120a does not overlap with the lower core 80'. The assembly of the center shaft M and the lower core 80' forms a striking member made of a magnetic material with one end striking the bottom plate part 120a of the shared yoke 120 and with the other end striking the lower plate spring 50'.

The ring-shaped permanent magnet 30' fit at the inner circumference side of the ring-shaped weight 20' of this embodiment is also not magnetized in the vertical direction, but is magnetized in a direction spanning the inner circumferential surface and the outer circumferential surface. For this reason, the magnetic flux emitted from the inner circumferential surface of the ring-shaped permanent magnet 30 passes near the top and bottom end faces and reaches the boundary of the inner circumferential surface of the ring-shaped weight 20' and the outer circumferential surface of the ring-shaped permanent magnet 30. The magnetic fluid F coated on this ring-shaped permanent magnet 30 surrounds the inner circumferential surface and top and bottom end faces of the ring-shaped permanent magnet 30, and the gap between the inner circumferential surface of the ring-shaped permanent magnet 30 and the outer circumferential surface of the excitation coil 60' is filled with magnetic fluid F. Due to the magnetic fluid F used as the shock absorber layer, even if external impact force is applied, collision with the excitation coil 60 of the ring-shaped permanent magnet 30' can be effectively suppressed and damage of the excitation coil 60' can be prevented in advance. Further, the top and bottom end faces of the ring-shaped magnet 30 are also covered with the magnetic fluid F, so collision of the ring-shaped permanent magnet 30 with the shared yoke 120, lower case body 110, etc. in the vertical direction can also be absorbed. The center tube part 120*b* and bottom plate part 120*a* of the shared yoke 120 function as a yoke connecting the magnetic flux from there to the lower core 80' and can lower the magnetic resistance for the excitation coil 60', so it is possible to obtain an effective reciprocating vibrating magnetic field.

Inside the center tube part 120*b* on this bottom plate part 120*a*, a permanent magnet 140 for a speaker magnetized in the vertical direction is carried. At the top surface, at the gap between the outer rim and the corner part C of the center tube part 120*b*, an upper yoke 150 forming the pole piece P is carried. At a short cylindrical top case body 160 on the shared yoke 120, a diaphragm 170 forming a sound board is provided. A cylindrical voice coil 180 is inserted from this diaphragm 170 to the pole piece P.

In this way, the shared yoke 120 connecting the magnetic flux of the excitation coil 60' also forms the pole piece P at the gap between the permanent magnet 140 for the speaker carried on that bottom plate part 120*a* and the corner part C, so the vibroacoustic converter of this embodiment can be reduced in the number of parts and be made more compact.

Summarizing the advantageous effects of the present invention, in the present invention, the ring-shaped permanent magnet fit at the inner circumference side of the ring-shaped weight is magnetized in a direction spanning the inner circumferential surface and the outer circumferential surface, so the magnetic fluid covers the inner circumferential surface and top and bottom end faces of the ring-shaped permanent magnet and the gap between the inner circumferential surface of the ring-shaped permanent magnet and the outer circumferential surface of the excitation coil is filled with magnetic fluid. Due to the magnetic fluid used as the shock absorber layer, even if an external impact force is applied, collision of the ring-shaped permanent magnet with the excitation coil can be suppressed and damage to the excitation coil can be prevented in advance.

While the invention has been described with reference to specific embodiments chosen for purpose of illustration, it should be apparent that numerous modifications could be made thereto by those skilled in the art without departing from the basic concept and scope of the invention.

What is claimed is:

1. A reciprocating vibration generator provided in a case with an elastic member for supporting a ring-shaped weight having a ring-shaped permanent magnet at its inner circumference side to be able to reciprocate in the vertical direction and a cylindrical excitation coil passing through the inside of the ring-shaped permanent magnet in the vertical direction and generating a reciprocating vibrating magnetic field,
    wherein the ring-shaped permanent magnet is magnetized in a direction spanning that inner circumferential surface and outer circumferential surface, the inner circumferential surface and top and bottom end faces of the ring-shaped permanent magnet are magnetically covered by magnetic fluid, and a gap between the inner circumferential surface and the outer circumferential surface of the excitation coil is filled with magnetic fluid.

2. A reciprocating vibration generator as set forth in claim 1, wherein said ring-shaped permanent magnet is comprised of a pair of semi-ring-shaped permanent magnets fit in the inner circumference side of said ring-shaped weight with the same magnetic poles facing each other.

3. A reciprocating vibration generator as set forth in claim 2, wherein said semi-ring-shaped permanent magnets are magnetized in parallel.

4. A reciprocating vibration generator as set forth in claim 1, wherein said elastic member has an upper plate spring connecting an end of an outer circumference side elastic piece to a top end face of said ring-shaped weight and a lower plate spring connecting an end of an outer circumference side elastic piece to a bottom end face of said ring-shaped weight, said case has an end plate fastening an inner circumference side of said lower plate spring, and said excitation coil is carried on said end plate and has a striking member made of a magnetic material passing through the inside of said excitation coil, having one end passing through a center part of said upper plate spring, having the other end passing through a hole of said lower plate spring, and striking against said end plate.

5. A reciprocating vibration generator as set forth in claim 1, wherein said elastic member has a lower plate spring connecting an end of an outer circumference side elastic piece to a bottom end face of said ring-shaped weight, said case has a bottom plate part to which an inner circumference side of said lower plate spring is fastened, and said excitation coil stands up from an end plate made of a magnetic material closing said case and has a striking member made of a magnetic material fit inside said excitation coil, having one end striking against a center part of the end plate, and having the other end striking against said lower plate spring.

\* \* \* \* \*